US012673335B2

(12) United States Patent
Pitaud

(10) Patent No.: US 12,673,335 B2
(45) Date of Patent: Jul. 7, 2026

(54) INCORPORATION DEVICE FOR FIELD SPRAYER

(71) Applicant: EXEL INDUSTRIES, Epernay (FR)

(72) Inventor: Sylvain Pitaud, Paris (FR)

(73) Assignee: EXEL INDUSTRIES, Epernay (FR)

( * ) Notice: Subject to any disclaimer, the term of this patent is extended or adjusted under 35 U.S.C. 154(b) by 879 days.

(21) Appl. No.: 17/812,511

(22) Filed: Jul. 14, 2022

(65) Prior Publication Data

US 2023/0014213 A1 Jan. 19, 2023

(30) Foreign Application Priority Data

Jul. 16, 2021 (FR) ...................................... 2107702

(51) Int. Cl.
    *B05B 7/28* (2006.01)
    *A01M 7/00* (2006.01)
(52) U.S. Cl.
    CPC ............. *B05B 7/28* (2013.01); *A01M 7/0092* (2013.01)
(58) Field of Classification Search
    CPC ........ B67C 11/00; B67C 11/04; B05B 7/2408
    See application file for complete search history.

(56) References Cited

U.S. PATENT DOCUMENTS 1,208,445 A * 12/1916 Arnold ...................... A45F 3/20
                                                    220/904
1,812,670 A * 6/1931 Wahl ...................... B60K 15/00
                                                    220/86.2

5,676,185 A * 10/1997 Starr ...................... B67C 11/02
                                                    141/300
6,264,072 B1 * 7/2001 Johannes ............. B65D 47/142
                                                    222/570
11,014,801 B2 * 5/2021 James ................... F16L 29/007
2004/0040616 A1 * 3/2004 Klemme ............. A01M 7/0085
                                                    141/104
2013/0140376 A1 6/2013 Ballu

FOREIGN PATENT DOCUMENTS

EP      2946664 A1   11/2015
EP      3225111 A1   10/2017
FR      3026400 A1    4/2016

OTHER PUBLICATIONS

Search Report from the French Intellectual Property Office on corresponding FR application (FR2107702) dated Mar. 10, 2022.
Search Report from the French Intellectual Property Office on corresponding FR application (FR2107706) dated Mar. 10, 2022.

* cited by examiner

*Primary Examiner* — Timothy P. Kelly
(74) *Attorney, Agent, or Firm* — Alumen IP Law PC

(57) ABSTRACT

The invention relates to an incorporation device for an agricultural sprayer, having a lower opening extending about a generally vertical first axis, an upper opening extending about a generally vertical second axis, and at least one side wall connecting the lower opening to the upper opening, the lower opening having a cross-sectional area smaller than that of the upper opening, the incorporation device thus generally having a funnel shape, the lower opening being further defined by a neck capable of reversibly and sealingly connecting to a closed transfer system for transferring a product to a liquid circuit of the agricultural sprayer to which the closed transfer system is connected.

20 Claims, 4 Drawing Sheets

INCORPORATION DEVICE FOR FIELD SPRAYER

TECHNICAL FIELD

The invention relates to an incorporation device for an agricultural sprayer, a subassembly comprising such an incorporation device and a closed transfer system, as well as an assembly comprising an agricultural sprayer and such a subassembly.

BACKGROUND

Closed transfer systems for agricultural sprayers, or "CTSs" are known from prior art. These closed transfer systems are provided to sealingly transfer product from a canister to a liquid circuit of an agricultural sprayer, in order to prevent a farmer handling the canister from being in contact with the product in the canister during the transfer. For this, they are capable of reversibly and sealingly connecting to the neck of the product canister, especially by means of an adapter.

However, not all product canisters are compatible with closed transfer systems, as their neck is not adapted to a connection with the closed transfer system, especially with the adapter. Furthermore, powdery or granular products are rarely packed in canisters.

This limits the use of closed transfer systems and may require more equipment on board the agricultural sprayer, especially a hopper for incorporating powdery products or products in canisters that are not in accordance with or incompatible with the closed transfer system. This necessarily results in a loss of compactness of the agricultural sprayer.

SUMMARY OF THE INVENTION

In order to overcome these problems, one object of the present invention is an incorporation device for an agricultural sprayer, comprising a lower opening extending about a generally vertical first axis, an upper opening extending about a generally vertical second axis, and at least one side wall connecting the lower opening to the upper opening, the lower opening having a cross-sectional area, taken perpendicular to the first axis, which is smaller than a cross-sectional area, taken perpendicular to the second axis, of the upper opening, the incorporation device thus generally having the shape of a funnel, the lower opening being further defined by a neck capable of reversibly and sealingly connecting to a closed transfer system for transferring a product to a liquid circuit of the agricultural sprayer to which the closed transfer system is connected.

According to alternative embodiments which may be taken together or separately:
- the neck comprises an external thread capable of cooperating with an internal thread of the closed transfer system;
- a number of thread turns of the external thread of the neck is equal to 2.5;
- a thread pitch of the external thread of the neck is equal to 4.23 mm;
- a thread diameter of the external thread of the neck is equal to 63.5 mm with a tolerance of +0.25 mm and –0.00 mm;
- a neck external diameter of the neck is equal to 59.7 mm with a tolerance of +0.25 mm and –0.00 mm;

- a free space extending radially around the external thread of the neck is equal to or greater than 7 mm;
- a neck internal diameter of the neck is equal to or greater than 53 mm;
- a neck height is equal to or greater than 18 mm;
- a thread angle is equal to 10° with a tolerance of +/–1° 30';
- a distance between two thread turns of the external thread of the neck is equal or greater than 1.05 mm;
- a top diameter of the neck is equal to 57.7 mm with a tolerance of +1.00 mm and –0.0 mm;
- an ovalization of the neck is equal or lower than 0.3 mm;
- a flatness of a surface of a top of the neck has defects less than or equal to 0.2 mm;
- the or one of the side walls carries a canister flushing duct which passes through said side wall, the canister flushing duct comprising an internal end, which is surrounded by the side wall(s) and facing the upper opening, opposite the neck, and an external end which is located opposite the internal end with respect to the side wall(s) and is capable of connecting to a flushing pipe;
- the upper opening is defined by a rim forming an annular housing about the second axis, the housing accommodating an openwork annular portion of a hopper flushing duct, the hopper flushing duct further comprising a supply portion connected to the annular portion, passing through the or one of the side walls and capable of connecting to a supply pipe;
- the side wall(s) are integral with the upper opening and the neck, the incorporation device thus forming a rigid one-piece assembly;
- the side wall comprises a flexible canvas and ribs or rods designed and configured to stretch the canvas into a funnel shape;
- the side wall is designed and configured to be foldable and unfoldable.

The invention further relates to a subassembly comprising an incorporation device as previously described and a closed transfer system capable of being connected to a liquid circuit of an agricultural sprayer, the neck of the incorporation device being designed and configured to reversibly and sealingly connect to the closed transfer system.

The invention also relates to an assembly comprising an agricultural sprayer and a subassembly as previously described, the agricultural sprayer comprising a liquid circuit connected to the closed transfer system.

BRIEF DESCRIPTION OF THE DRAWINGS

Other aspects, purposes, advantages and characteristics of the invention will better appear from the following detailed description of preferred embodiments thereof, given as non-limiting examples, and made with reference to the appended drawings in which.

DETAILED DESCRIPTION

Figure 1:
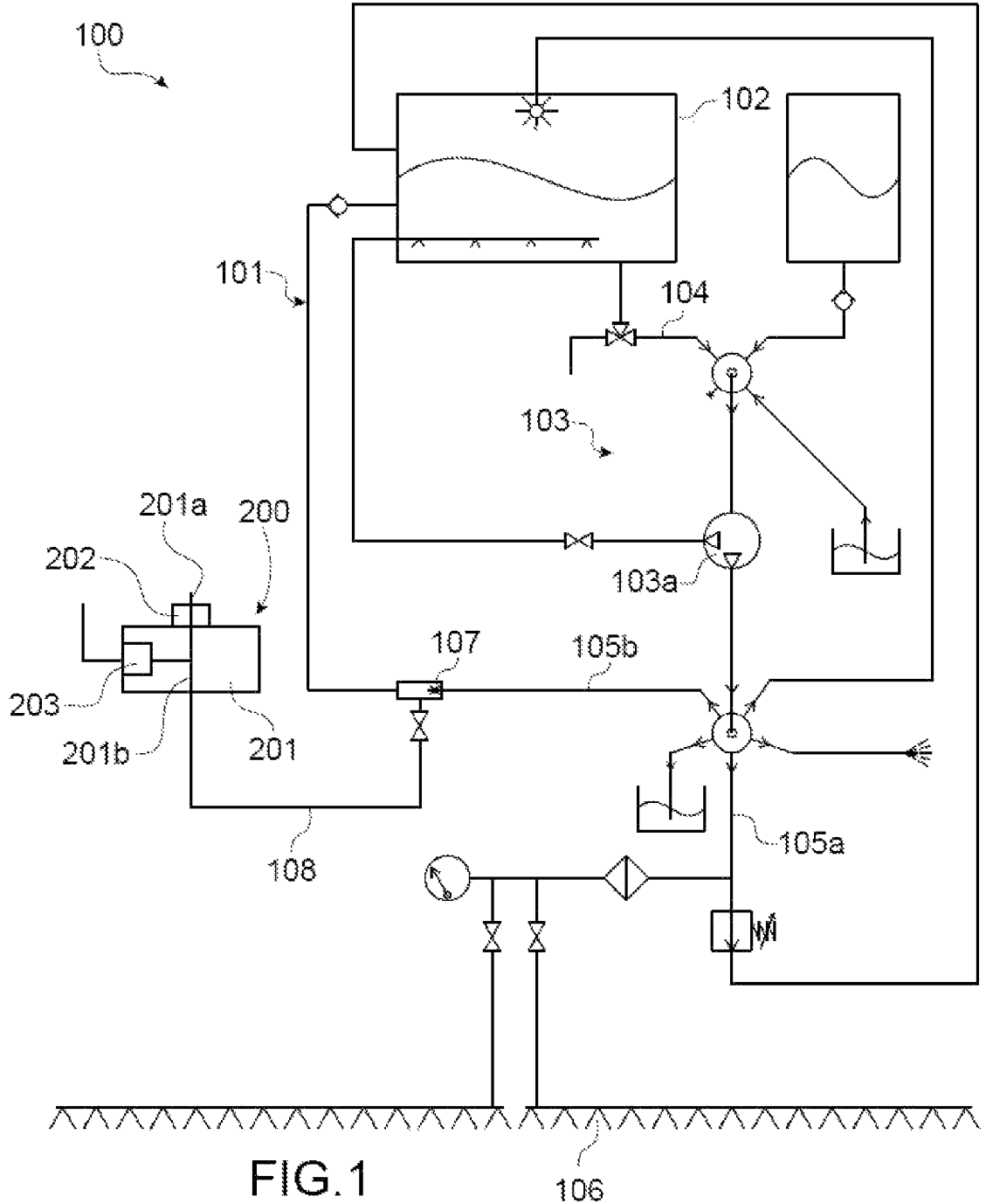
FIG. 1 is a schematic view of an agricultural sprayer comprising a liquid circuit connected to a closed transfer system.

FIG. 1 shows an agricultural sprayer 100 comprising a liquid circuit 101 in turn comprising a main tank 102, a pumping assembly 103, at least one suction line 104 and at least two discharge lines 105*a*, 105*b*.

The pumping assembly 103 is designed to suck liquid from the or one of the suction lines 104 to discharge it to the discharge line(s) 105*a*, 105*b*. For this purpose, it comprises especially a pump 103*a*.

The or one of the suction lines 104 connects the main tank 102 to the pumping assembly 103.

One 105*a* of the discharge lines 105*a*, 105*b*, called the spray line, connects the pumping assembly 103 to spray nozzles 106 for spraying liquid discharged by the pumping assembly 103 onto plants to be treated in a field. Another 105*b* of the discharge lines 105*a*, 105*b*, called the incorporation line, connects the pumping assembly 103 to the main tank 102. The incorporation line 105*b* comprises a suction mechanism 107, such as a Venturi device, designed to suck product from an incorporation path 108, as liquid from the pumping assembly 103 circulates along the incorporation line 105*b*. The product from the incorporation path 108 is thus incorporated into the liquid from the pump assembly 103 circulating along the incorporation line 105*b*, so as to supply the main tank 102 with this liquid into which the product has been incorporated. The incorporation path 108 is, for example, connected to a closed transfer system 200 or "CTS", which may or may not be on board the agricultural sprayer 100. The closed transfer system 200 is designed to sealingly transfer product from a canister to the liquid system 101 of the agricultural sprayer 100. The closed transfer system 200 is especially in accordance with ISO 21191 published on Feb. 26, 2021.

Figure 2:
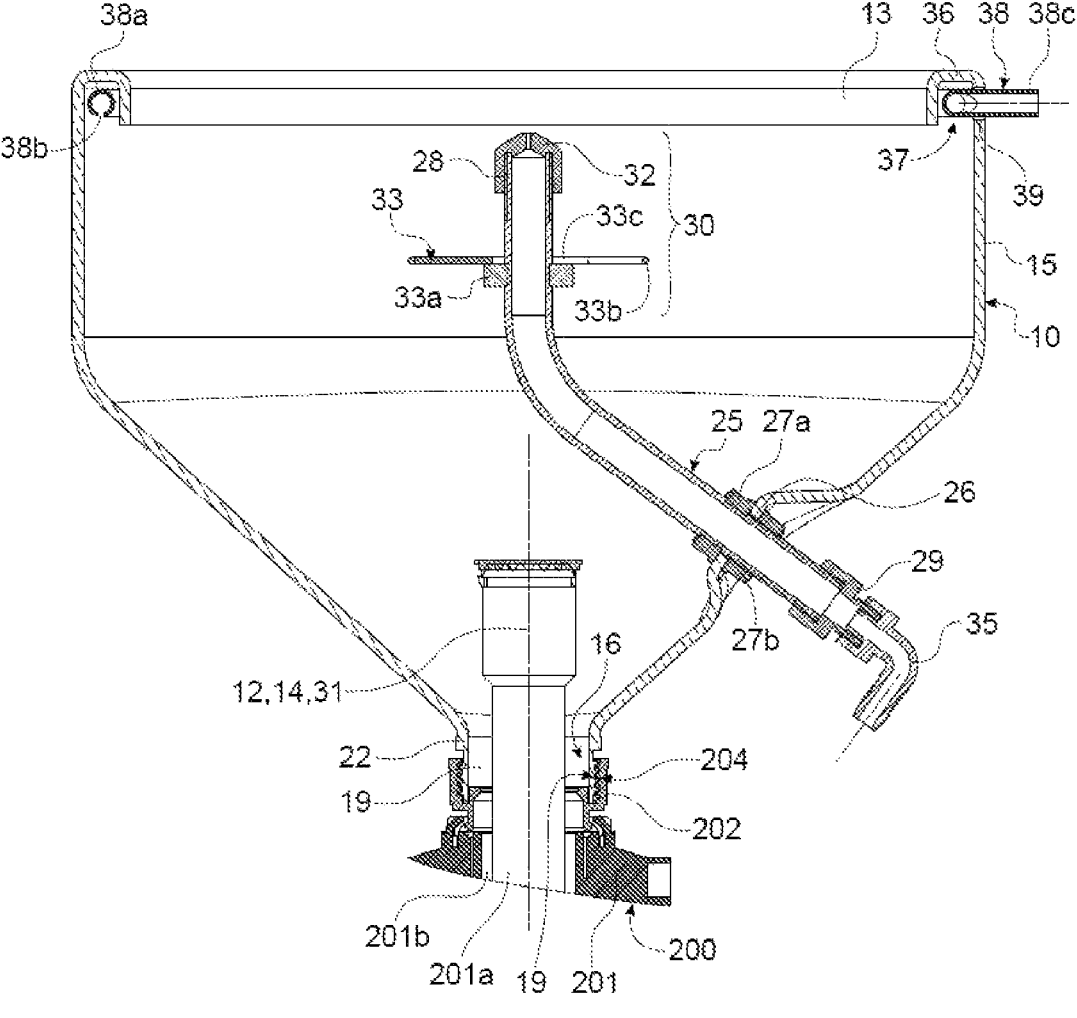
FIG. 2 is a cross-section view of an incorporation device for an agricultural sprayer according to an embodiment of the invention, which is connected to a closed transfer system as illustrated in FIG. 1.

For this, the closed transfer system 200 comprises, for example, a transfer device 201 connected or capable of connecting to the liquid circuit 101 of the agricultural sprayer 100, especially to the incorporation path 108, as well as an adapter 202 capable of reversibly and sealingly connecting a neck of the product canister to the transfer device 201 for transferring product from the canister to the liquid circuit 101 of the agricultural sprayer 100, especially to the main tank 102 via the incorporation path 108 and the suction mechanism 107. For this, the adapter 202 is capable, on the one hand, of reversibly and sealingly connecting to the neck of the canister, and on the other hand, of reversibly and sealingly connecting to the transfer device 201. The transfer device 201 is designed to allow the transfer of liquid from the canister to the liquid circuit 101 of the agricultural sprayer 100, especially by communicating the canister with the liquid circuit 101, when the adapter 202 sealingly connects the canister neck to the transfer device 201. In FIG. 2 and without limitation, the transfer device 201 comprises an extensible pole 201*a* designed to deploy inside the canister and to clear a passage 201*b* to the liquid circuit 101, the interior of the canister then communicating with the liquid circuit 101 via the passage 201*b*, when the extensible pole 201*a* is deployed inside the canister. Other mechanisms may be implemented by the closed transfer system 200 to communicate the interior of the canister with the liquid circuit 101.

The sealed transfer of product provided by the closed transfer system 200 thus prevents contact between a farmer handling the product canister and the product transferred from the canister to the liquid circuit 101 of the agricultural sprayer 100.

The closed transfer system 200 may also comprise a flushing device 203 for flushing the canister when the canister neck is sealingly connected to the closed transfer system 200, especially through the adapter 202. In FIG. 2 and without limitation, the flushing device 203 comprises the extensible pole 201*a* which is also designed to project a flushing liquid, such as clear water, into the canister, when the extensible pole 201*a* is deployed inside the canister. The flushing device 203 may be connected or capable of being connected to a source of flushing liquid, which may or may not be external to the agricultural sprayer 100.

FIG. 2 shows an incorporation device 10 for an agricultural sprayer 100 according to an embodiment of the invention.

The incorporation device 10 comprises a lower opening 11 extending about a generally vertical first axis 12, an upper opening 13 extending about a generally vertical second axis 14, which may or may not be coincident with the first axis 12, and at least one side wall 15 connecting the lower opening 11 to the upper opening 13. The side wall(s) 15 together define the interior of the incorporation device 10.

The lower opening 11 further has a cross-sectional area, taken perpendicular to the first axis 12, that is smaller than a cross-sectional area, taken perpendicular to the second axis 14, of the upper opening 13. The incorporation device 10 thus generally has a funnel shape.

According to the invention, the lower opening 11 is further defined by a neck 16 capable of reversibly and sealingly connecting to the closed transfer system 200, especially to the adapter 202 of the closed transfer system 200.

The incorporation device 10 thus enables the closed transfer system 200 to be used even when a powdery or granular product or a product contained in a canister that is not in accordance with or is incompatible with the closed transfer system 200, especially with the adapter 202 of the transfer system 200, is to be transferred. The closed transfer system 200 operates with the incorporation device 10 in the same manner as described above with a product canister that is in accordance with or compatible with the closed transfer system 200.

By virtue of the incorporation device 10, it is further possible to provide an incorporation line 105*b* of the agricultural sprayer 100 without an incorporation hopper, which would be on board the agricultural sprayer 100 and connected to the suction mechanism 103, in parallel to the closed transfer system 200, for incorporating powdery product or product contained in a canister not in accordance with or incompatible with the closed transfer system 200. This represents a gain in volume and thus enables a better compactness of the liquid circuit 101 of the agricultural sprayer 100, especially when the closed transfer system 200 is on board the agricultural sprayer 100.

Figure 3:
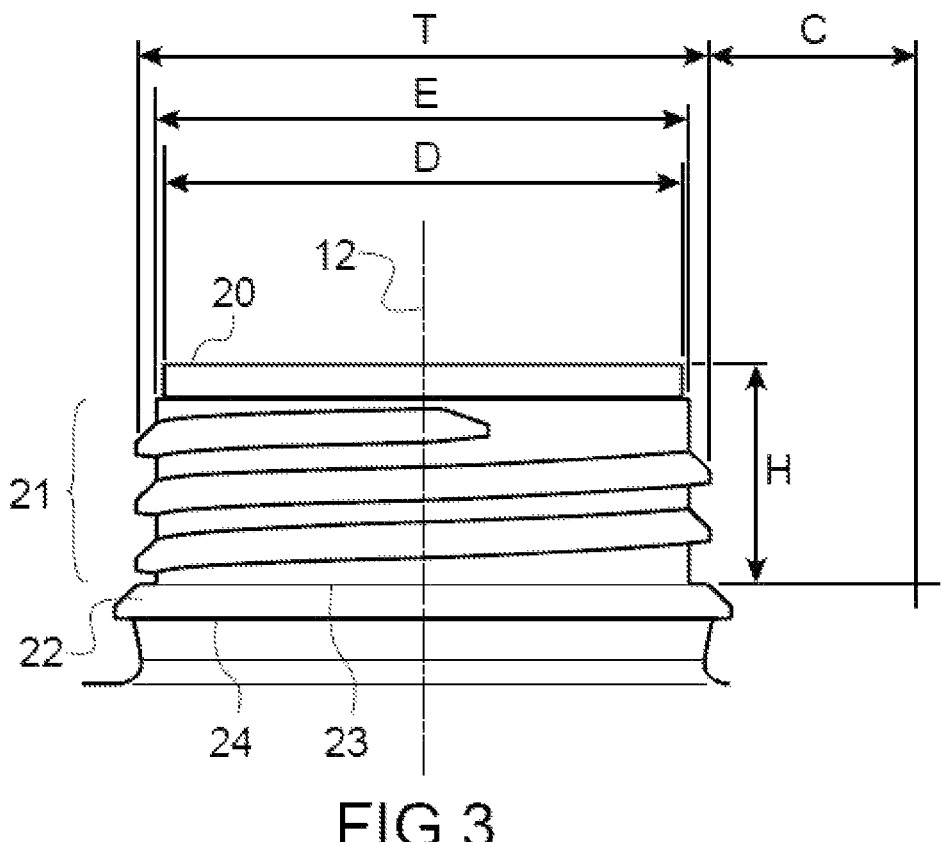
FIG. 3 is a detail view of a neck of an incorporation device according to an embodiment of the invention.
Figure 4:
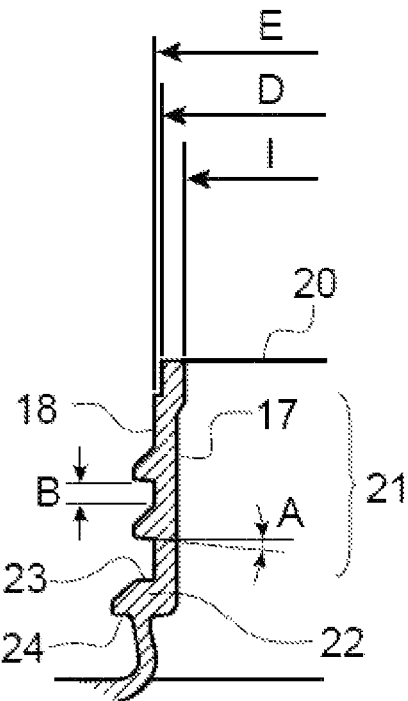
FIG. 4 is a cross-section, partial detail view of the neck of the incorporation device illustrated in FIG. 3.

An example of a neck 16 of the incorporation device 10 is shown in more detail in FIGS. 3 and 4.

The neck 16 extends radially about the first axis 12 and comprises a radial internal surface 17 facing the first axis 12 and a radial external surface 18, opposite the radial internal surface 17 (FIG. 4). The radial internal surface 17 is, for example, arranged parallel to the first axis 12.

The neck 16, especially the radial external surface 18 of the neck 16, has, for example, an external thread 19 capable of cooperating with an internal thread 204 of the closed transfer system 200, especially of the adapter 202 of the closed transfer system 100 (FIG. 2), so as to provide a sealed connection between the neck 16 and the closed transfer system 200.

The neck 16 may further comprise, in succession, along the first axis 12, a free end 20, also referred to as the top, a threaded portion 21 having the external thread 19, as well as a connection portion, for example formed by a flange 22, from which the side wall(s) 15 extend(s) (FIGS. 3 and 4).

The top 20 of the neck 16 especially forms a flat surface perpendicular to the first axis 12. For example, the flange 22 projects radially from the radial external surface 18 of the neck 16. The flange 22 comprises a top 23 connected to the threaded portion 21 and a land 24 from which the side wall(s) 15, especially an external surface of said side walls 15, extend(s). The top 23 of the flange 22 forms, for example, a flat surface perpendicular to the first axis 12.

The neck 16 has, for example, one or more of the following characteristics:

a number of thread turns of the external thread 19 of the neck 16 is equal to 2.5;

a thread pitch of the external thread 19 of the neck 16 is equal to 4.23 mm;

a thread diameter T of the external thread 19 of the neck 16 is equal to 63.5 mm with a tolerance of +0.25 mm and −0.00 mm (FIG. 3), the thread diameter T corresponding to the external diameter of the thread of the external thread 19 of the neck 16 and is determined as the average of two perpendicular diameters, said diameters being especially measured outside the weld of the neck 16, that is outside a plane of the weld seam of the neck 16 which extends parallel to the first axis 12;

a neck external diameter E of the neck 16 is equal to 59.7 mm with a tolerance of +0.25 mm and −0.00 mm (FIGS. 3 and 4), the neck external diameter E corresponding to the external diameter of the threaded portion 21 of the neck 16, without the thread, especially of the radial external surface 18 at the threaded portion 21, and is determined as being the average of two perpendicular diameters, said diameters being measured especially outside the weld of the neck 16, that is outside a plane of the weld seam of the neck 16 which would extend parallel to the first axis 12;

a free space C extending radially around the external thread 19 of the neck 16 is equal to or greater than 7 mm (FIG. 3);

a neck internal diameter I of the neck 16 is equal to or greater than 53 mm (FIG. 4), the neck internal diameter I corresponding to the minimum internal diameter of the neck 16, especially of the internal radial surface 17 of the neck 16, over the entire height of the neck 16;

a neck height H between the top 20 of the neck 16 and the top 23 of the flange 22 is equal to or greater than 18 mm (FIG. 3), the neck height H being taken along the first axis 12;

a thread angle A is equal to 10° with a tolerance of +/−1° 30' (FIG. 4), the thread angle A corresponding to the angle defined between a plane perpendicular to the first axis 12 and a face of the thread of the external thread 19 of the neck 16 which faces the flange 22;

a distance between two thread turns B of the external thread 19 of the neck 16 is equal to or greater than 1.05 mm (FIG. 4), the distance between two thread turns B corresponding to a distance between two consecutive turns of the thread of the external thread 19 of the neck 16, taken at the radial external surface 18 of the neck 16 along the first axis 12;

a top diameter D of the neck 16 is equal to 57.7 mm with a tolerance of +1.00 mm and −0.0 mm (FIGS. 3 and 4), the top diameter D corresponding to an external diameter of the top 20 of the neck 16;

an ovalization of the neck 16 is equal to or less than 0.3 mm, the ovalization corresponding to a difference between a minimum diameter and a maximum diameter of the neck 16, the minimum diameter and the maximum diameter can be internal diameters or external diameters or diameters of the thread;

a flatness of the surface of the top 20 of the neck 16 has defects less than or equal to 0.2 mm.

The side wall(s) 15 are, for example, made in one piece with the upper opening 13 and the neck 16. The incorporation device 10 thus forms a rigid, one-piece or unitary assembly. The incorporation device 10 may be made from a rigid plastic material, such as polyethylene.

The or one of the side walls 15 carries, for example, a canister flushing duct 25 which passes through said side wall 15, especially by means of a first hole 26 provided in said side wall 25 for this purpose. The canister flushing duct 25 may further be fitted with sealing rings 27a, 27b mounted tightly around the canister flushing duct 25 and arranged against the side wall 15, on either side thereof, in order to prevent any leakage via the first hole 26.

The canister flushing duct 25 may also comprise an internal end 28 surrounded by the side wall(s) 15 and an external end 29 located opposite the internal end 28 relative to the side wall(s) 15. The internal end 28 is thus arranged inside the incorporation device 10, while the external end 29 is arranged outside the incorporation device 10.

The canister flushing duct 25 may further comprise an internal portion 30 surrounded by the side wall(s) 15, and thus arranged inside the incorporation device 10, and extending along a generally vertical third axis 31, which may or may not be coincident with the first and/or second axis 12, 14. The internal portion 30 carries the internal end 28 of the canister flushing duct 25, which faces the upper opening 13, opposite the neck 16, and may be fitted with a nozzle 32 for projecting a flushing liquid, such as clear water, into a canister to be flushed, slipped on around the internal portion 30 of the canister flushing duct 25 through its internal end 28. An openwork support 33, arranged perpendicular to the third axis 31, for example, surrounds the internal portion 30 to support the neck of the canister to be flushed, when slipped on around the internal portion 30 of the canister flushing duct 25 through its internal end 28. The openwork support 33 is for example formed by a central collar 33a mounted integral with the internal portion 30 of the canister flushing duct 25, especially by screwing, and on which a concentric ring 33b is fixed by means of spokes 33c. The ring 33b and the spokes 33c are, for example, formed by stainless steel wires.

The external end 29 of the canister flushing duct 25 is, for example, capable of connecting to a flushing pipe (not represented) for supplying the canister flushing duct 25 with flushing liquid. For this purpose, the external end 29 may be provided with a hydraulic supply connector 35.

The upper opening 13 of the incorporation device 10 is defined, for example, by a rim 36 forming an annular, circular or polygonal housing 37 about the second axis 14 and facing the interior of the incorporation device 10 and the neck 16. The housing 37 may accommodate an openwork annular portion 38a of a hopper flushing duct 38, complementary in shape to the housing 37. The annular portion 38a of the hopper flushing duct 38 has, for example, a plurality of perforations 38b, especially facing the neck 16, for flushing the side wall(s) 15 inside the incorporation device 10. The perforations 38b may be replaced by one or more notches or one or more grooves, such as a single annular, circular or polygonal groove. The hopper flushing duct 38 may further comprise a supply portion 38c connected to the annular portion 38a and passing through the or one of the side walls 15, especially by means of a second hole 39, to be supplied with flushing liquid, especially via a supply pipe (not represented).

As an alternative (not represented), the side wall 15 comprises a flexible canvas and ribs or rods designed to stretch the canvas into a funnel shape. The flexible canvas is, for example, made from an elastomer, such as rubber, or polyvinyl chloride. The side wall 15 is mounted integral with the rigid neck 16, for example by gluing, screwing, clamping, welding or crimping. The side wall 15 can further be foldable and unfoldable, especially by means of spring-loaded ribs tending to unfold the flexible canvas in a funnel shape. Alternatively, the ribs or rods may be pivotally mounted to each other, especially about pivot axes circumferentially facing the vertical direction, between a folded position in which the ribs or rods are collapsed over each other and an unfolded position in which the ribs or rods give the side wall 15 its funnel shape. A mechanism for locking and unlocking the ribs or rods may also be provided to lock the ribs or rods in the unfolded position, and thereby give the side wall 15 its funnel shape, and to unlock the ribs or rods from their unfolded position, and thereby allow them to pivot between the unfolded and folded positions. The pivoting ribs or rods and the locking and unlocking mechanism thus form a system of foldable and unfoldable rigid supports.

The above-described incorporation device 10 is particularly advantageous because it enables the closed transfer system 200 to be used under any circumstances, even when a powdery or granular product or a product contained in a canister that is not in accordance with or is incompatible with the closed transfer system 200, is to be transferred to the liquid circuit 101 of the agricultural sprayer 100.

The invention claimed is:

1. An incorporation device for an agricultural sprayer, comprising a lower opening extending about a generally vertical first axis, an upper opening extending about a generally vertical second axis, and at least one side wall connecting the lower opening to the upper opening, the lower opening having a cross-sectional area, taken perpendicular to the first axis, which is smaller than a cross-sectional area, taken perpendicular to the second axis, of the upper opening, the incorporation device thus generally having the shape of a funnel, the incorporation device wherein the lower opening is defined by a neck capable of reversibly and sealingly connecting to a closed transfer system for transferring a product to a liquid circuit of the agricultural sprayer to which the closed transfer system is connected.

2. The incorporation device according to claim 1, wherein the neck comprises an external thread capable of cooperating with an internal thread of the closed transfer system.

3. The incorporation device according to claim 2, wherein:

a number of thread turns of the external thread of the neck is equal to 2.5; and/or a thread pitch of the external thread of the neck is equal to 4.23 mm; and/or a thread diameter of the external thread of the neck is equal to 63.5 mm with a tolerance of +0.25 mm and −0.00 mm; and/or a neck external diameter of the neck is 59.7 mm with a tolerance of +0.25 mm and −0.00 mm; and/or a free space extending radially around the external thread of the neck is equal to or greater than 7 mm; and/or a neck internal diameter of the neck is equal to or greater than 53 mm; and/or a neck height is equal to or greater than 18 mm; and/or a thread angle is equal to 10° with a tolerance of +/−1°30'; and/or a distance between two thread turns of the external thread of the neck is equal to or greater than 1.05 mm; and/or a top diameter of the neck is equal to 57.7 mm with a tolerance of +1.00 mm and −0.0 mm; and/or an ovalization of the neck is equal to or less than 0.3 mm; and/or a flatness of a surface of a top of the neck has defects less than or equal to 0.2 mm.

4. The incorporation device according to claim 1, wherein the or one of the side walls carries a canister flushing duct that passes through said side wall, the canister flushing duct comprising an internal end, which is surrounded by the side wall(s) and facing the upper opening, opposite the neck, and an external end which is located opposite the internal end with respect to the side wall(s) and is capable of connecting to a flushing pipe.

5. The incorporation device according to claim 1, wherein the upper opening is defined by a rim forming an annular housing about the second axis, the housing accommodating an openwork annular portion of a hopper flushing duct, the hopper flushing duct further comprising a supply portion connected to the annular portion, passing through the or one of the side walls and capable of connecting to a supply pipe.

6. The incorporation device according to claim 1, wherein the side wall(s) are made in one piece with the upper opening and the neck, the incorporation device thus forming a rigid one-piece assembly.

7. The incorporation device according to claim 1, wherein the side wall comprises a flexible canvas and ribs or rods configured to stretch the canvas into a funnel shape.

8. The incorporation device according to claim 7, wherein the side wall is configured to be foldable and unfoldable.

9. A subassembly comprising an incorporation device according to claim 1 and a closed transfer system capable of being connected to a liquid circuit of an agricultural sprayer, the neck of the incorporation device being configured to reversibly and sealingly connect to the closed transfer system, wherein the product from the incorporation device is transferred to the liquid circuit of the agricultural sprayer through a suction mechanism.

10. An assembly comprising an agricultural sprayer and a subassembly according to claim 9, the agricultural sprayer comprising a liquid circuit connected to the closed transfer system.

11. The incorporation device according to claim 1, further comprising a closed transfer system having an adapter attached to the neck at the lower opening, the closed transfer system comprising a transfer device having an opening in communication with the lower opening of the body, and an extensible pole passing through the lower opening of the body and the opening of the transfer device.

12. The incorporation device of claim 11, wherein the neck of the lower opening comprises external threads cooperating with internal threads of the adapter.

13. The incorporation device of claim 11, wherein the body has a side opening located between the upper opening and the lower opening, the side opening having at least one sealing ring pressed thereagainst.

14. The incorporation device of claim 13, further comprising a flushing duct projecting through the side opening.

15. The incorporation device according to claim 11, wherein:

a number of thread turns of the external thread of the neck is equal to 2.5; and/or a thread pitch of the external thread of the neck is equal to 4.23 mm; and/or a thread diameter of the external thread of the neck is equal to 63.5 mm with a tolerance of +0.25 mm and −0.00 mm; and/or a neck external diameter of the neck is 59.7 mm with a tolerance of +0.25 mm and −0.00 mm; and/or a free space extending radially around the external thread of the neck is equal to or greater than 7 mm; and/or a neck internal diameter of the neck is equal to or greater than 53 mm; and/or a neck height is equal to or greater than 18 mm; and/or a thread angle is equal to 10° with a tolerance of +/−1°30'; and/or a distance between two thread turns of the external thread of the neck is equal to or greater than 1.05 mm; and/or a top diameter of the neck is equal to 57.7 mm with a tolerance of +1.00 mm and −0.0 mm; and/or an ovalization of the neck is equal to or less than 0.3 mm; and/or a flatness of a surface of a top of the neck has defects less than or equal to 0.2 mm.

16. The incorporation device according to claim 11, wherein the upper opening is defined by a rim forming an annular housing about the second axis, the housing accommodating an openwork annular portion of a hopper flushing duct, the hopper flushing duct further comprising a supply portion connected to the annular portion, passing through the or one of the side walls and capable of connecting to a supply pipe.

17. An incorporation device for an agricultural sprayer comprising:

a body having a lower opening extending about a generally vertical first axis, an upper opening extending about a generally vertical second axis, and at least one side wall connecting the lower opening to the upper opening, the lower opening having a cross-sectional area, taken perpendicular to the first axis, which is smaller than a cross-sectional area, taken perpendicular to the second axis, of the upper opening, the body of the incorporation device having a funnel-like shape;

a neck at the lower opening, the neck being sized and shaped to reversibly and sealingly connect to a closed transfer system for transferring a product inside the body to a liquid circuit of the agricultural sprayer; and a side opening located between the upper opening and the lower opening, the side opening having at least one sealing ring pressed thereagainst.

18. The incorporation device according to claim 17, further comprising a closed transfer system having an adapter attached to the neck at the lower opening, the closed transfer system comprising a transfer device having an opening in communication with the lower opening of the body, and an extensible pole passing through the lower opening of the body and the opening of the transfer device.

19. The incorporation device according to claim 17, wherein the body has a side wall made in one piece with the upper opening and the neck.

20. The incorporation device according to claim 19, wherein the side wall comprises a flexible canvas and ribs or rods configured to stretch the canvas into a funnel shape.

* * * * *